(12) United States Patent
Lehmann et al.

(10) Patent No.: US 12,301,070 B2
(45) Date of Patent: May 13, 2025

(54) ELECTRICAL DRIVE DEVICE AND DRIVE ASSEMBLY

(71) Applicant: Schaeffler Technologies AG & Co. KG, Herzogenaurach (DE)

(72) Inventors: Steffen Lehmann, Ettlingen (DE); Andreas Trinkenschuh, Bühl (DE); Dirk Bleckmann, Werdohl (DE); Dominik Weis, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 352 days.

(21) Appl. No.: 17/641,153

(22) PCT Filed: Aug. 25, 2020

(86) PCT No.: PCT/DE2020/100738
§ 371 (c)(1),
(2) Date: Mar. 8, 2022

(87) PCT Pub. No.: WO2021/047717
PCT Pub. Date: Mar. 18, 2021

(65) Prior Publication Data
US 2022/0337133 A1  Oct. 20, 2022

(30) Foreign Application Priority Data

Sep. 10, 2019 (DE) .................... 10 2019 124 231.2

(51) Int. Cl.
*H02K 11/33* (2016.01)
*H02K 5/22* (2006.01)
*H02K 11/40* (2016.01)

(52) U.S. Cl.
CPC ............. *H02K 11/33* (2016.01); *H02K 5/225* (2013.01); *H02K 11/40* (2016.01)

(58) Field of Classification Search
CPC ......... H02K 11/33; H02K 11/40; H02K 5/225
See application file for complete search history.

(56) References Cited

U.S. PATENT DOCUMENTS

2020/0169014 A1*  5/2020  Goetz ................... H05K 3/325
2021/0098151 A1*  4/2021  Gissler ................ E21B 33/0385
2021/0356110 A1*  11/2021  Zhang ................. F21V 19/0055

FOREIGN PATENT DOCUMENTS

| CN | 105765791 A | 7/2016 |
| CN | 107110258 A | 8/2017 |

(Continued)

*Primary Examiner* — Forrest M Phillips
(74) *Attorney, Agent, or Firm* — Volpe Koenig

(57) ABSTRACT

An electrical drive device includes a machine unit having a machine housing and power electronics having an electronics housing. At least one of the two housings having at least one protrusion for defined positioning of the machine unit and the power electronics against each other during and/or after assembly. The respective other housing having a complementary cut-out in shape and size for receiving the protrusion, wherein material forming the protrusion and the cut-out is electrically conductive at least in some sections. The protrusion and the cut-out are electrically connected to an earth for the purpose of earthing the power electronics or the machine unit.
The electrical drive device and the drive assembly equipped therewith allow the electromagnetic compatibility to be optimized in a cost-effective manner.

13 Claims, 3 Drawing Sheets

(56) References Cited

FOREIGN PATENT DOCUMENTS

| | | |
|---|---|---|
| CN | 107206884 A | 9/2017 |
| CN | 110771017 A | 2/2020 |
| CN | 103443470 A | 12/2023 |
| DE | 112015006071 T5 | 10/2017 |
| EP | 2072828 A1 | 6/2009 |
| EP | 2500578 A1 | 9/2012 |
| WO | 2018197473 A1 | 11/2018 |
| WO | WO-2021047717 A1 * | 3/2021 ............. H02K 11/33 |

* cited by examiner

ELECTRICAL DRIVE DEVICE AND DRIVE ASSEMBLY

CROSS-REFERENCE TO RELATED APPLICATIONS

This application is the U.S. National Phase of PCT Appln. No. PCT/DE2020/100738 filed Aug. 25, 2020, which claims priority to DE 10 2019 124 231.2 filed Sep. 10, 2019, the entire disclosures of which are incorporated by reference herein.

TECHNICAL FIELD

The disclosure relates to an electrical drive device and to a drive assembly having an electrical drive device and an internal combustion engine.

BACKGROUND

Various electrical drive devices are known which are used in drive trains or drive assemblies, in particular for hybrid motor vehicles.

Such electrical drive devices comprise at least one electrical rotary machine arranged in a housing as well as a power electronics.

The power electronics is used to control or supply the electrical rotary machine or electrical rotary machines with electrical energy, wherein an electrical rotary machine is usually designed as a multiphase three-phase machine.

In addition, the power electronics can include a control interface for connecting a control device of a motor vehicle and/or an electrical interface for connecting an energy store, such as a battery. The power electronics can also include the control device itself. The control device is used to control the electrical rotary machine or the electrical rotary machines. Several control interfaces or electrical interfaces can be provided, depending on the number of devices to be connected.

Usually, the power electronics with its housing is firmly arranged on a housing of a machine unit of the electrical drive device comprising the electrical rotary machine or electrical rotary machines.

For the purpose of controlling or supplying the electrical rotary machine or electrical rotary machines, at least one electrically conductive connection, but preferably several electrically conductive connections, is/are implemented between the power electronics and the machine unit.

When current flows through this at least one electrical connection, a high-frequency electromagnetic field can form, which is transmitted via the corresponding housings and via these to the environment.

This high-frequency electromagnetic field can potentially impair the function of a radio in the MW or FM range and/or cause interference with electronic control devices in a motor vehicle or in the immediate vicinity of the motor vehicle equipped with the electrical drive device.

In order to improve the electromagnetic compatibility of known electrical drive devices, groundings for the housings of the power electronics and the housings of the electrical rotary machine or electrical rotary machines are currently being implemented.

Generally, separate elements such as grounding cables with corrosion protection are used for this purpose. However, both their manufacture and the insertion of such grounds in an electrical drive device involve a correspondingly high effort.

SUMMARY

From this standpoint, the present disclosure is based on the object of providing an electrical drive device and a drive assembly equipped therewith which increase electromagnetic compatibility in a cost-effective manner.

The object is achieved by the electrical drive device according to the disclosure as described herein. Advantageous embodiments of the electrical drive device are described herein. In addition, a drive assembly comprising the electrical drive device is described herein.

The features of the claims may be combined in any technically useful way, including the explanations given in the following description and features of the figures can be used which comprise additional embodiments of the disclosure.

The disclosure relates to an electrical drive device comprising a machine unit with a machine housing and at least one electrical rotary machine arranged therein, and comprising power electronics having an electronics housing and control electronics arranged therein. At least one of the two housings has at least one protrusion for the purpose of defined positioning of the machine unit and the power electronics against each other during and/or after assembly. The respective other housing has complementary cut-out in shape and size for receiving the protrusion. It is provided that the material forming the protrusion and the cut-out is electrically conductive at least in sections and that the protrusion and the cut-out are electrically connected to a ground for the purpose of grounding the power electronics or the machine unit.

Accordingly, it is provided in the sense of the disclosure that protrusions and cut-outs present on the housings that are mounted or that are to be mounted fulfill a dual function, namely on the one hand facilitating assembly operations with regard to carrying out defined relative movements of the housings with respect to one another during assembly and fixing in the final target position, wherein the two housings are guided in their relative movements with respect to one another by means of the protrusion and cut-out, and on the other hand providing a ground for the power electronics and/or the machine unit. In the mounted state, the protrusion and the cut-out realize a fixation of the two housings in at least two translational degrees of freedom as well as two rotational degrees of freedom. With a preferred arrangement of multiple protrusions and complementary cut-outs, all three rotational degrees of freedom can be taken from the two housings.

For the purposes of the disclosure, the machine unit can also be understood as a combination of a drive unit, such as the electrical rotary machine, with gear elements or a gearbox.

In the present case, the power electronics is essentially a control device for controlling the machine unit.

Control electronics in the sense of the disclosure is to be understood as at least one electronic component, but usually as a system of several electronic components electronically coupled to one another.

In the present case, ground refers to the contact between an electrical pole, in particular the negative pole or what is termed the ground, and the body or a supporting frame of the motor vehicle.

Therefore, if the machine unit has a ground, the power electronics can be grounded via the electrically conductive connection implemented according to the disclosure via the machine unit.

If the power electronics has a ground, the machine unit can be grounded via the electrically conductive connection realized according to the disclosure via the power electronics.

In a preferred embodiment, the machine unit has a ground and the power electronics is also grounded via the electrically conductive connection and the machine unit.

According to another aspect of the disclosure, the protrusion is formed on the electronics housing and the cut-out is formed in the machine housing.

In particular, the protrusion is made of a corrosion-resistant material, such as stainless steel.

According to another embodiment, the protrusion has the shape of a pin and the cut-out has the shape of a bore in which the pin is received.

This means that the protrusion has a substantially slender cylindrical shape, wherein the cut-out is correspondingly configured as a slender hollow cylinder.

Accordingly, the pin can be a separate element, wherein a fixed and electrically conductive connection is realized between the respective housing on which the pin is arranged and the pin. According to the disclosure, however, this does not exclude the possibility of the pin also being an integral part of a housing.

In a complementary embodiment, the pin is seated in the bore with an interference fit.

The interference fit provides a force-fit between the pin and the bore.

In another complementary embodiment, an electrically conductive tolerance sleeve is arranged between the pin and the bore.

A tolerance sleeve, also known as a tolerance ring, is used to bridge distances between rotationally symmetrical machine elements that are plugged into one another other. The tolerance sleeve is resiliently supported both on the pin and on the inner wall of the cut-out. The tolerance sleeve can be substantially wave-shaped along its circumferential direction.

In the present case, the tolerance sleeve thus serves to position the pin in the cut-out and, correspondingly, to mechanically fix it in the aforementioned degrees of freedom. However, the tolerance sleeve also serves to realize the electrically conductive connection for the purpose of grounding.

In particular, it can be provided that the tolerance sleeve is made of stainless steel at least in sections.

According to another aspect of the electrical drive device, a seal is arranged between the two housings.

Preferably, this seal radially surrounds the pin and is designed as a fluid seal for preventing lubricants from entering the power electronics from the machine housing, and/or for preventing moisture from entering the machine housing or the electronics housing from the environment.

The seal is preferably designed as an O-ring. However, according to the disclosure, this does not exclude the possibility that the seal may also be of a different design.

In a further embodiment, plug-in connection elements are arranged on both housings, which are configured to be plugged into one another along a plug-in connection direction for producing at least one electrically conductive plug-in connection for the purpose of realizing a respective electrical connection between the machine unit and the power electronics, wherein the plug-in connection direction runs parallel to the longitudinal extension direction of the pin.

Accordingly, it is provided that the two housings are brought closer to one another in their relative movements during assembly in such a way that pin-shaped protrusions are inserted into hollow-cylindrical cut-outs when the assembly movement is carried out and thus precisely define the movement direction of the assembly movement. This movement direction also corresponds to the plug-in connection direction in which the plug-in connection elements are to be plugged into one another, so that the design of the housings according to the disclosure, in addition to the assembly and positioning of the housings against one another, also facilitates the electrical contacting and/or enables the assembly to be carried out automatically.

According to another advantageous embodiment of the disclosure, the material of the machine housing and/or the electronics housing is an aluminum alloy or a magnesium alloy.

In addition, according to the disclosure, a drive assembly is provided, having an electrical drive device according to the disclosure and an internal combustion engine, wherein the internal combustion engine is coupled or couplable in a non-rotatable manner to the rotor of the electrical rotary machine.

BRIEF DESCRIPTION OF THE DRAWINGS

The disclosure described above is explained in detail below based on the relevant technical background with reference to the associated drawings, which show preferred embodiments. The disclosure is in no way restricted by the purely schematic drawings, although it should be noted that the embodiments shown in the drawings are not limited to the dimensions shown. In the drawings.

DETAILED DESCRIPTION

Figure 1:
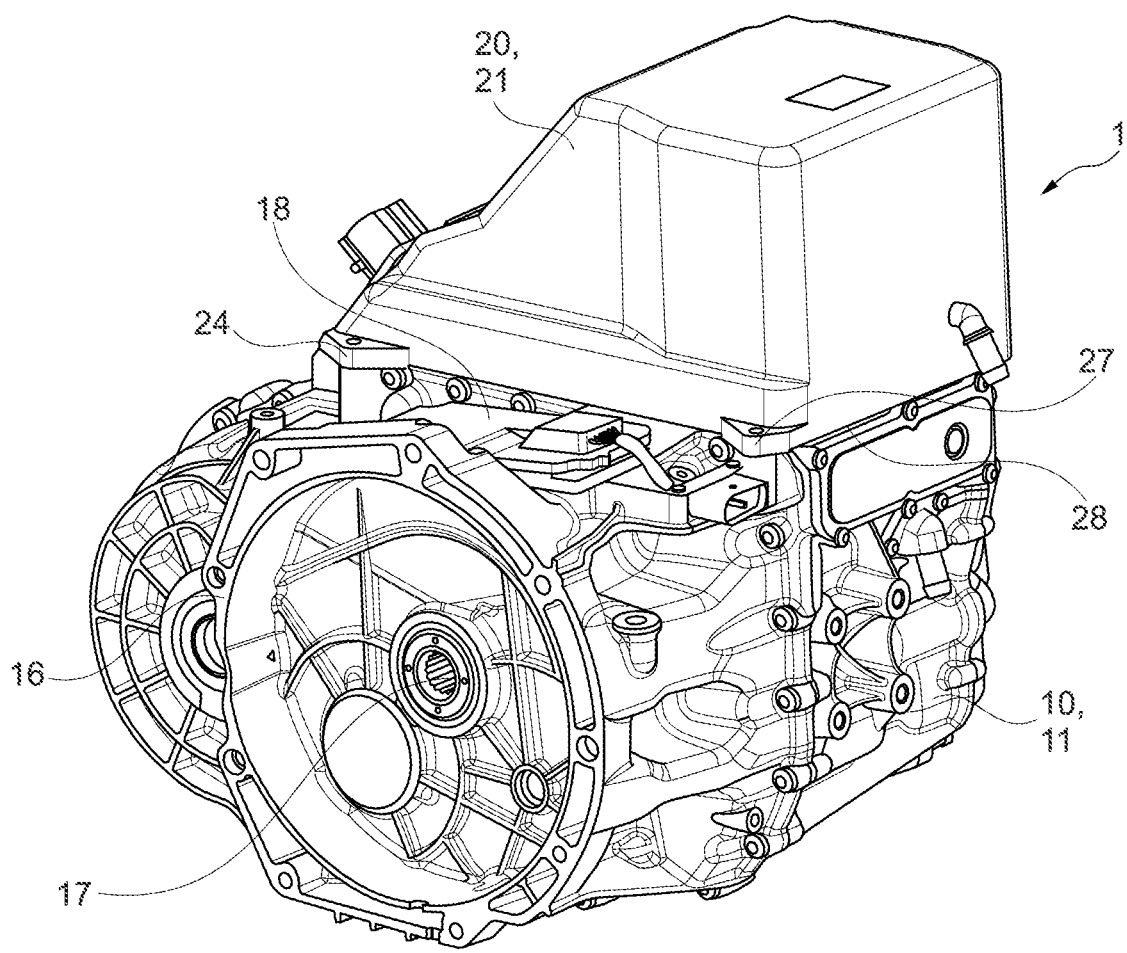
FIG. 1: shows a perspective view of an electrical drive device according to the disclosure.

FIG. 1 shows a perspective view of an electrical drive device 1 according to the disclosure.

The electrical drive device 1 comprises a machine unit 10 and a power electronics 20.

The machine unit 10 has a machine housing 11 in which at least one electrical rotary machine is arranged. This serves to integrate the electrical drive device 1 into a drive assembly of a hybrid motor vehicle, which further comprises an internal combustion engine for realizing various driving operations of the hybrid motor vehicle. The coupling with the internal combustion engine is realized at the connection side 18 of the machine housing 10. The connection side 18 of the machine housing 10 is designed as a hub 17 with a spline. Correspondingly, torque can be transmitted between the electrical drive device and the internal combustion engine.

The power electronics 20 with its electronics housing 21 is arranged on a top side 18 of the machine housing 11 of the machine unit 10. The power electronics 20 comprises control electronics in the electronics housing 21 (not shown here) and essentially serves to control the machine unit 10, wherein a plurality of electrically conductive connections are implemented between the power electronics 20 and the machine unit 10 for this purpose. The electronics housing 21 is arranged with a connection side 28, which corresponds to a bottom side of the power electronics 20, on the top side 18 of the machine housing 11 and is fixedly connected to the machine housing 11. This fixed connection is realized via screw or bolt connections at a respective corner area of the power electronics 20. For this purpose, the electronics housing 21 has connection flanges 27 on its connection side 28, through which screws or bolts are accordingly passed and inserted into the machine housing 11 for the purpose of implementing the fixed connection of the two housings 11, 21 to one another.

Figure 2:
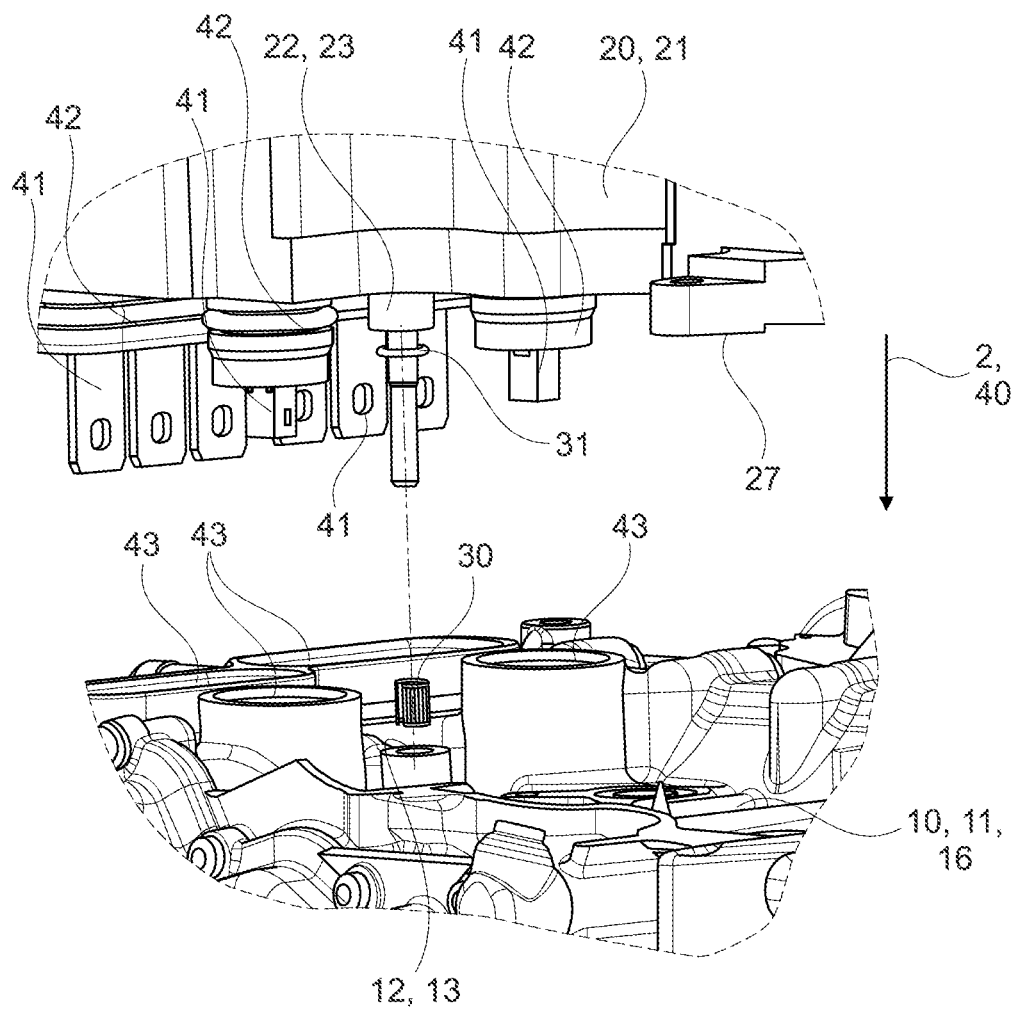
FIG. 2: shows a section of the electrical drive device during an assembly step.

FIG. 2 shows a section of the electrical drive device 1 during an assembly step.

In the assembly step, the power electronics 20 is arranged with its connection side 28 on the top side 18 of the machine unit 10. This illustration of the assembly step shows the power electronics 20 in a position spaced apart from the top side 18 of the machine unit 10, revealing a protrusion 22 and plug-in connection elements 41 arranged on protruding form elements 42 of the electronics housing 21 on the connection side 28 of the electronics housing 21. A cut-out 12 and form elements 43 of the machine housing 11 are visible on the top side 18 of the machine housing 11. The form elements 43 of the machine housing 11 are designed as hollow-cylindrical and elongated hole-shaped cut-outs in the top side 18 of the machine housing 11, in which plug-in connection elements of the machine housing 11, which are not visible here, are arranged.

The form elements 43 of the electronics housing 21 are designed to be complementary to a respective form element 43 of the machine housing 21 in shape, size and position. The plug-in connection elements 41 of the electronics housing 21 are configured as pin-shaped elements protruding from the connection side 28 of the electronics housing 21.

The cut-out 12 has the shape of a bore 13. The protrusion 22 has a slender cylindrical shape, so that the protrusion is formed as a pin 23. The protrusion 22 is also complementary to the cut-out 12 in size and position.

The longitudinal extension directions of the bore 13, the pin 23 and the plug-in connection elements 41 run parallel to one another, so that a movement direction 2 of an assembly movement is also parallel to them.

When the power electronics 20 is moved along the movement direction 2 of the assembly movement towards the machine unit 10, the plug-in connection elements 41 of the electronics housing 21 are inserted into the plug-in connection elements of the machine housing 11 and the pin 23 is inserted into the bore 13.

A plug-in connection direction 40, along which the plug-in connection elements 41 are arranged to be plugged into one another, corresponds here to the movement direction 2 of the assembly movement, which in turn is defined by the longitudinal extension directions of the bore 13 and pin 23. The plugging of the plug-in connection elements 40, 41 into one another serves to produce at least one electrically conductive plug-in connection for the purpose of realizing a respective electrical connection between the electrical rotary machines of the machine unit 10 and the control electronics of the power electronics 20.

The longitudinal extension of the pin 23 is longer than the longitudinal extension of a respective plug-in connection element 41 of the electronics housing 21, so that in the assembly step shown here, the pin 23 is inserted into the bore 13 before the plug-in connection elements 41 of the electronics housing 21 are inserted into the plug-in connection elements of the machine housing 11, whereby the pin 23 in the bore 13 acts as a guide along the movement direction 2 of the assembly movement.

In addition, it is shown in FIG. 2 that a seal 31 in the form of an O-ring is arranged on the pin 23, and that a tolerance sleeve 30 is arranged radially between the pin 23 and the bore 13 in such a way that it realizes an electrical contact between the bore 13 and the pin 23 when the pin 23 is inserted into the bore 13.

Figure 3:
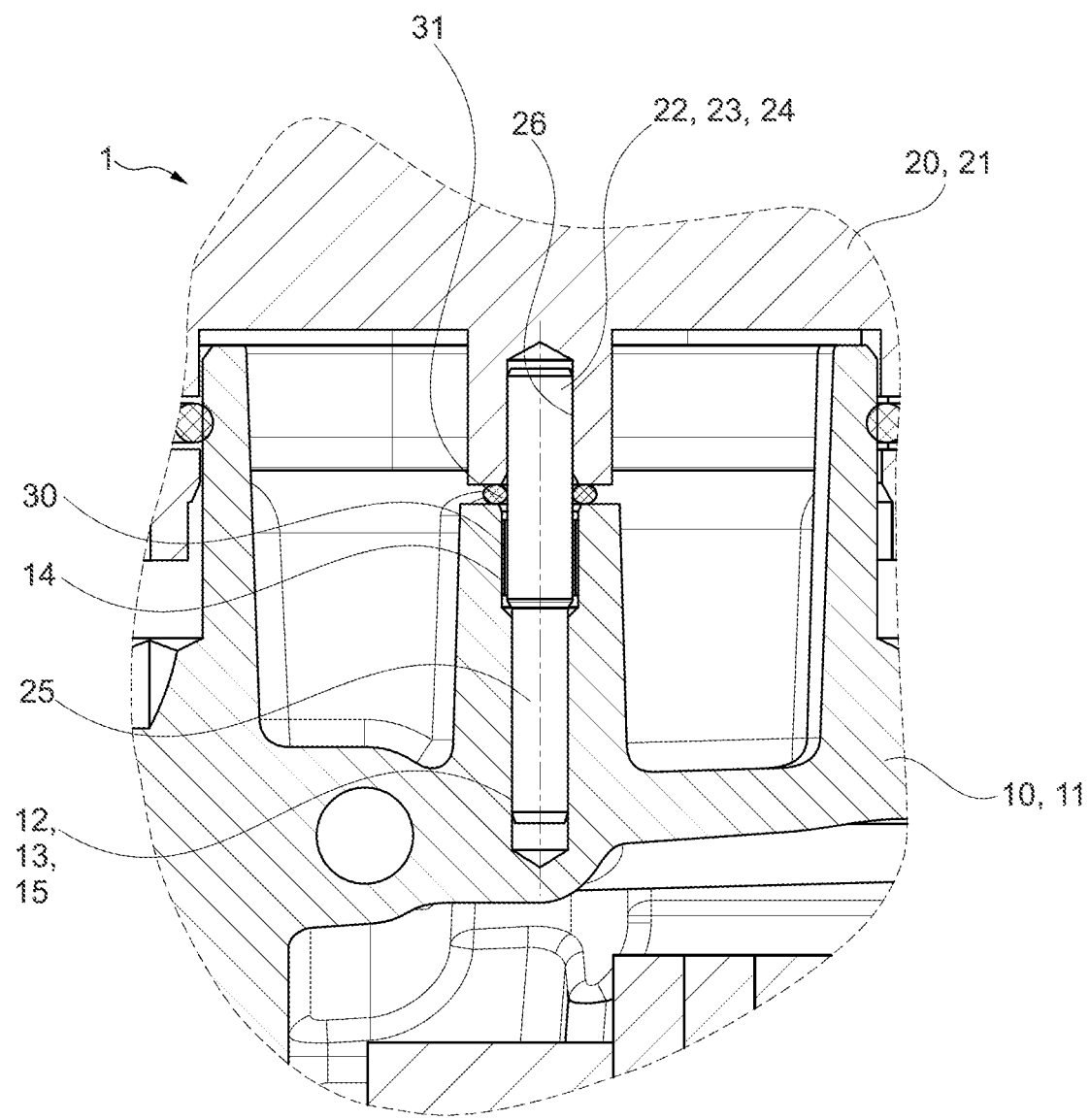
FIG. 3: shows a sectional view of the electrical drive device.

FIG. 3 shows a side section view of the electrical drive device 1.

Here, the power electronics 20 is arranged on the machine unit 10 and the cutting plane runs parallel to the movement direction of the assembly movement through the bore 13 and pin 23.

Supplementary to FIG. 2, it can be seen that the protrusion 22 is implemented in such a way that the pin 23 is fixedly arranged as a separate component in an opening 26 in the electronics housing 21 of the power electronics 20.

In this regard, the pin 23 comprises a first pin portion 24 and a second pin portion 25, and the bore 13 comprises a first bore portion 14 and a second bore portion 15.

The diameter of the first pin portion 24 is larger than the diameter of the second pin portion 25. The diameter of the first bore portion 14 is larger than the diameter of the second bore portion 15.

Substantially, the diameter of the first pin portion 24 corresponds to the diameter of the opening 26. The diameter of the second pin portion 25 substantially corresponds to the diameter of the second bore portion 15.

The pin 23 is arranged in sections with its first pin portion 24 in the opening 26 in the electronics housing 21 and in sections in the first bore portion 14. With its second pin portion 25, the pin 23 is arranged in the second bore portion 15.

However, the diameter of the first bore portion 14 is larger than the diameter of the first pin portion 24, wherein the tolerance sleeve 30 is arranged between the first bore portion 14 and the first pin portion 24 perpendicular to the movement direction of the assembly movement.

The tolerance sleeve 30 is used to bridge the distance between the first pin portion 24 and the first bore portion 14, and to support positioning and electrical contacting between the pin 23 and the bore 13.

The seal 31, configured as an O-ring, is arranged on the first pin portion 24 such that it is arranged along the movement direction of the assembly movement between the part of the electronics housing 21 forming the opening 26 and the part of the machine housing 11 forming the cut-out 12, thereby sealing the plug-in connection between the pin 23 and the bore 13 from the environment.

The material forming the pin 23 and the bore 13 is designed to be electrically conductive at least in sections, so that by means of the insertion of the pin 23 into the bore 13 and an electrically conductive connection realized therewith between the pin 23 and the bore 13, grounding of the power electronics 20 via the grounded machine unit 10 or a grounding of the machine unit 10 via the grounded power electronics 20 is realized.

The electrical drive device according to the disclosure and the drive assembly equipped therewith allow the electromagnetic compatibility to be optimized in a cost-effective manner.

LIST OF REFERENCE SYMBOLS

1 Electrical drive device
2 Movement direction of the assembly movement
10 Machine unit
11 Machine housing
12 Cut-out
13 Bore 14 First bore portion
15 Second bore portion
16 Connection side of the machine housing
17 Hub
18 Top side of the machine housing
20 Power electronics
21 Electronics housing
22 Protrusion
23 Pin
24 First pin portion
25 Second pin portion
26 Opening
27 Connecting flange
28 Connection side of the electronics housing
30 Tolerance sleeve
31 Seal
40 Plug-in connection direction
41 Plug-in connection element of the electronics housing
42 Form element of the electronics housing
43 Form element of the machine housing

The invention claimed is:

1. An electrical drive device, comprising:
a machine unit having a machine housing and at least one electrical rotary machine arranged therein, and
a power electronics having an electronics housing and control electronics arranged therein, the electronics housing having at least one protrusion for defined positioning of the machine unit and the power electronics against each other during or after assembly, and the machine housing having a complementary cut-out in shape and size for receiving the protrusion,
wherein material forming the protrusion and the cut-out is electrically conductive at least in some sections, and the protrusion and the cut-out are electrically connected to a ground for grounding the power electronics or the machine unit, and a seal is arranged on the protrusion and between the machine housing and the electronics housing.

2. The electrical drive device according to claim 1, wherein the machine unit has a ground and the power electronics are also grounded via the electrically conductive connection and the machine unit.

3. The electrical drive device according to claim 1, wherein the protrusion has a shape of a pin and the cut-out has the shape of a bore in which the pin is received.

4. The electrical drive device according to claim 3, wherein the pin is seated in the bore with an interference fit.

5. The electrical drive device according to claim 3, wherein an electrically conductive tolerance sleeve is arranged between the pin and the bore.

6. The electrical drive device according to claim 3, wherein plug-in connection elements are arranged on the machine housing and the electronics housing, which are configured to be plugged into one another along a plug-in connection direction for producing at least one electrically conductive plug-in connection for realizing a respective electrical connection between the machine unit and the power electronics, wherein the plug-in connection direction runs in parallel to a longitudinal extension direction of the pin.

7. The electrical drive device according to claim 1, wherein the material of at least one of the machine housing and the electronics housing is
i) an aluminum alloy, or
ii) a magnesium alloy.

8. A drive assembly having an electrical drive device according to claim 1 and comprising an internal combustion engine configured to be couplable in a non-rotatable manner to a rotor of the electrical rotary machine.

9. An electrical drive device comprising:
a machine unit having a machine housing and at least one electrical rotary machine arranged therein, and
a power electronics having an electronics housing and control electronics arranged therein, at least one of the machine housing and the electronics housing having at least one pin for defined positioning of the machine unit and the power electronics against each other during and after assembly, and the respective other housing having a complementary bore in shape and size for receiving the pin,
wherein material forming the pin and the bore is electrically conductive at least in some sections, and the pin and the bore are electrically connected to a ground for grounding the power electronics or the machine unit; and
wherein the pin includes a first pin portion with a first diameter that is larger than a second diameter of a second pin portion of the pin, wherein the bore includes a first bore portion with a first diameter that is larger than a second diameter of a second bore portion of the bore, and the first diameter of the first bore portion is larger than the first diameter of the first pin portion.

10. The electrical drive device according to claim 9, wherein the first pin portion is a first axial length of the pin, and the second pin portion is a second axial length of the pin.

11. The electrical drive device according to claim 9, wherein the second diameter of the second pin portion corresponds to the second diameter of the second bore portion.

12. The electrical drive device according to claim 9, wherein a tolerance sleeve is arranged radially between the first bore portion and the first pin portion.

13. The electrical drive device according to claim 12, wherein the tolerance sleeve is configured to bridge a distance between the first pin portion and the first bore portion, and to support positioning and electrical contacting between the pin and the bore.

* * * * *